United States Patent
Holub et al.

[15] 3,678,015
[45] July 18, 1972

[54] PROCESS FOR MAKING POLYIMIDE PREPOLYMER WITH MIXTURE OF PHENOLIC AND HYDROCARBON SOLVENTS

[72] Inventors: Fred F. Holub; John T. Hoback, both of Schenectady, N.Y.

[73] Assignee: General Electric Company

[22] Filed: April 6, 1970

[21] Appl. No.: 26,079

[52] U.S. Cl. ............... 260/78 UA, 204/159.22, 260/30.2, 260/31.8 N, 260/32.6 N, 260/33.4 R, 260/33.6 UA, 260/33.8 UA, 260/41 R, 260/47 UA, 260/47 CZ, 260/47 CP, 260/65, 260/78 TF, 260/827, 260/857 UN, 260/875, 260/897 B, 260/899
[51] Int. Cl. ........................................... C08g 20/32
[58] Field of Search ............................... 260/78 UA

[56] References Cited

UNITED STATES PATENTS

| | | | |
|---|---|---|---|
| 2,174,619 | 10/1939 | Carothers | 260/78 UA |
| 2,306,918 | 12/1942 | Weiss et al. | 260/78 UA |
| 3,380,964 | 4/1968 | Grundschober et al. | 260/78 UA |
| 3,406,148 | 10/1968 | Sambeth et al. | 260/78 UA |
| 3,533,996 | 10/1970 | Grundschober et al. | 260/78 UA |

*Primary Examiner*—Harold D. Anderson
*Attorney*—Richard R. Brainard, Joseph T. Cohen, Paul A. Frank, Charles T. Watts, William A. Teoli, Frank L. Neuhauser, Oscar B. Waddell and Joseph B. Forman

[57] ABSTRACT

A method is provided for making a curable polymeric reaction product of an organic diamine and an aliphatically unsaturated dicarbonyl compound such as an organic anhydride or organic dicarboxylic acid. The curable polymeric reaction product can be heat softened to allow incorporation of filler and is convertible to the infusible state by heat or by the employment of a free radical initiator. Reaction of the organic diamine and the aliphatically unsaturated dicarbonyl compound is effected in a phenolic-liquid hydrocarbon solvent medium. The hydrocarbon can serve as an azeotroping agent to effect removal of water of reaction prior to the recovery of the reaction product of the organic diamine and the aliphatically unsaturated dicarbonyl compound. The polymeric reaction product can be molded to produce high temperature resistant polyimide films and structures.

6 Claims, No Drawings

PROCESS FOR MAKING POLYIMIDE PREPOLYMER WITH MIXTURE OF PHENOLIC AND HYDROCARBON SOLVENTS

The present invention relates to a method for effecting reaction between an organic diamine and an aliphatically unsaturated dicarbonyl compound, such as an organic anhydride, in a phenolic hydrocarbon solvent medium and to products produced thereby.

Prior to the present invention, mixtures of aliphatically unsaturated organic anhydrides, such a maleic anhydride and organic diamines were generally employed to make aliphatically unsaturated bisimides. Grundschober et al. U.S. Pat. No. 3,380,964 shows that m-phenylene-bis-maleimide, can be converted to the infusible state at temperatures up to 400° C. Although the conversion of such bisimides to the infusible state can provide cured products having valuable insulating and dielectric properties, the cured products are generally extremely brittle. In addition, these bisimides have sharp melting points causing them to flow suddenly limiting their usefulness in commercial molding applications.

The present invention is based on a discovery that a mixture of organic diamine and aliphatically unsaturated dicarbonyl compound, such as an organic anhydride, or organic dicarboxylic acid, can be converted to a polyimide prepolymer having improved processability in molding applications. The method involves forming a solution of organic diamine and aliphatically unsaturated dicarbonyl compound, in a phenolic hydrocarbon solvent medium, and heating the solution to effect the separation of an azeotrope of the hydrocarbon solvent and water of reaction of the organic diamine and the unsaturated dicarbonyl compound.

There is provided by the present invention a method which comprises:
1. heating a mixture comprising (A) organic diamine, (B) aliphatically unsaturated dicarbonyl reactant selected from organic anhydrides and organic dicarboxylic acids, (C) a hydrocarbon solvent, and (D) a phenolic solvent,
2. separating a hydrocarbon solvent-water azeotrope from the mixture of (1), and
3. recovering a curable polymeric product comprising the reaction product of (A) and (B) from the resulting mixture of (1).

Some of the organic diamines which can be employed in the practice of the invention are compounds included by the formula, $$NH_2RNH_2, \qquad (1)$$

where R is a diorgano radical, for example a heterocyclic radical, an arylene radical having from six to 15 carbon atoms and YGY, where Y is arylene, such as phenylene, toluene, anthrylene, arylenealkylene, such as phenyleneethylene, etc., G is a divalent organo radical selected from alkylene radicals having from one to 10 carton atoms, —O—, —S—, SO₂,

where Z is selected from methyl and trihalomethyl such as trifluoromethyl, trichloromethyl, etc.

Organic diamines included by formula (1) are, for example, m-phenylenediamine; p-phenylenediamine; 4,4'-diaminodiphenylpropane; 4,4'-diaminodiphenylmethane; benzidine; 4,4'-diaminodiphenylsulfide; 4,4'-diaminodiphenylsulfone; 3,3'-diaminodiphenylsulfone; 4,4'-diaminodiphenyl ether; 2,6-diaminopyridine; bis(4-aminophenyl)phosphineoxide; bis(4-aminophenyl)-N-methylamine; 1,5-diaminonaphthalene; 3,3'-dimethyl-4,4'-diaminobiphenyl; 3,3'-dimethoxybenzidine; 2,4-bis(β-amino-t-butyl)toluene; bis(p-β-amino-t-butylphenyl) ether; p-bis(2-methyl-4-aminopentyl)benzene; p-bis(1,1-dimethyl-5-aminopentyl)benzene, m-xylenediamine; p-xylenediamine; bis(p-aminocyclohexyl)methane; ethylenediamine; propylenediamine; hexamethylenediamine; heptamethylenediamine; otctamethylenediamine; nonamethylenediamine; decamethylenediamine; 3-methylheptamethylenediamine; 4,4-dimethylheptamethylenediamine; 2,11-diaminododecane; 1,2-bis(3-aminopropoxy)ethane; 2,2-dimethylpropylenediamine; 3-methoxyhexamethylenediamine; 2,5-dimethylhexamethylenediamine; 5-methylnonamethylenediamine; 1,4-diaminocyclohexane; 1,12-diaminooctadecane; 2,5-diamino-1,3,4-oxadiazole; $H_2N(CH_2)_3O(CH_2)_2O(CH_2)_3NH_2$; $H_2N(CH_2)_3S(CH_2)_3NH_2$; $H_2N(CH_2)_3N(CH_3)(CH_2)_3NH_2$; and mixtures thereof. Organic amine mixtures consisting essentially of the organic diamines of formula (1), and organic monoamines such as arylamines, for example aniline, aminobiphenyl, etc.; aliphatic amines such as allylamines, etc., also can be employed as the organic diamine in the practice of the invention.

Included by the aliphatically unsaturated carbonyl compounds which can be used in the practice of the invention are organic anhyrides, such as maleic anhydride, citraconic anhydride and itaconic anhydride. Mixtures of such aliphatically unsaturated anhydrides and organic anhydrides such as tetrahydrophthalic anhydrides and endomethylenetetrahydrophthalic anhydride, or "Nadic" organic anhydride and methyl and halogen, for example chloro derivatives of such anhydrides, etc. also can be employed.

In addition to the above organic anhydrides, the aliphatically unsaturated carbonyl compounds also include aliphatically unsaturated dicarboxylic acids such as fumaric, maleic, 5-vinyl-isophthalic, etc.

Mixtures of such aliphatically unsaturated carbonyl compounds containing up to 10 mole percent of organic dianhydrides, for example pyromellitic dianhydride, 3,3',4,4'-benzophenone dianhydride, etc., based on the total moles of components in the anhydride mixture also can be employed.

In the practice of the invention, a mixture of the organic diamine as defined above, and the aliphatically unsaturated carbonyl compound, which hereinafter can signify the aliphatically unsaturated anhydride, dicarboxylic acid or mixtures thereof is formed in a phenolic-hydrocarbon solvent medium. The term "phenolic" solvent as utilized in the invention signifies mixtures of o-,p-,m-cresols, known as cresylic acid, and mixtures of cresylic acid with phenol. The resulting mixture is heated to form a solution. Water of reaction of the aliphatically unsaturated carbonyl compound and the organic diamine is continuously separated as a hydrocarbon-water azeotrope. The resulting mixture is allowed to cool. The resulting reaction mixture can be employed to treat substrates to provide polyimide films by solvent evaporation and heat cure. If desired, the polymeric reaction product hereinafter referred to as "prepolymer" or aliphatically unsaturated imide prepolymer can be recovered by pouring the reaction mixture into a medium such as water, methanol, etc.

In forming the reaction mixture, the order of addition of the various ingredients is not critical. There can be employed from 0.5 to 2 moles of organic diamine, and preferably from 0.6 to 1.2 moles, per mole of the aliphatically unsaturated dicarbonyl compound.

In the reaction mixture the proportions of solids and solvent can vary widely. Preferably, solids can be employed at about 20 to 50 percent by weight of total mixture. Effective results can be achieved with as little as 10 percent by weight of phenolic solvent, while the amount of hydrocarbon solvent which can be employed should be at least sufficient to effect the separation of water of reaction of the organic diamine and the aliphatically unsaturated dicarbonyl compound. Hydrocarbon solvents which can be employed preferably have a boiling point in the range of from 110° to 170° C. and include, for example, xylene, toluene, commercial hydrocarbon fractions, etc.

Effective results can be achieved at temperatures in the range of between 80° to 200° C. and preferably between 140° to 175° C. Depending upon such factors as the reactants, degree of agitation, temperature, etc., the formation of the prepolymer can be achieved in 2 hours or less.

Recovery of the prepolymer can be effected by allowing the reaction mixture to cool to room temperature and pouring the reaction mixture into a precipitating medium such as excess water, a monohydric aliphatic alcohol such as methanol, or other material employed in accordance with standard techniques. Filtration of the resulting mixture, followed by drying of the product will provide the prepolymer suitable for blending with other materials, such as filler, etc. If desired, the reaction solution can be employed directly without effecting the precipitation of the prepolymer to cast prepolymer film or to treat substrates by effecting the seaparation of the prepolymer through solvent evaporation.

The prepolymers of the present invention can be blended with various aliphatically unsaturated organic materials, such as aliphatically unsaturated organic monomers, and certain aliphatically unsaturated organic polymers as well as organic polymers free of aliphatic unsaturation. Blends of the prepolymers and the aforementioned organic monomers or polymers can be made over wide proportions by weight. Experience has shown that there should be employed at least about 25 percent by weight of prepolymer in the blend to provide for cured products having improved characteristics.

Among the various uses to which the aliphatically unsaturated imide prepolymers of the present invention can be employed are, for example to make laminating compounds, solvent resistant varnishes, molding compounds, coating compositions, etc., depending upon the proportions of the prepolymers and the organic polymer or monomer utilized in the blend.

Some of the aliphatically unsaturated monomers which can be blended with the prepolymers of the present invention are, for example styrene, bismaleimide, N-phenylmaleimide, divinylbenzene, triallylcyanurate, triallyltrimellitate. Among the organic polymers which can be employed in combination with the prepolymers of the present invention are, for example, polyvinylchloride, polyethylene, polypropylene, polysulfones, polystyrenes, polyurethane, organopolysiloxanes, polyesters, etc., and blends thereof.

Cure of the aliphatically unsaturated imide prepolymer of the present invention or blend thereof within the aforementioned organic monomers of polymers or combination thereof can be effected thermally or by the use of conventional free radical initiators. Temperatures of from 50° to 300°0 C. can be employed while 100° to 200° C. have sometimes been found to be more desirable. Acceleration of the cure of the aliphatically unsaturated prepolymer or blend thereof can be achieved with organic peroxides such as dicumyl peroxide, benzoyl peroxide, tertiary butylperbenzoate, tertiary alkylperoxy carbonate, azodicarboamide, 2,5-dimethyl-2,5-bis-(tertiarybutylperoxyhexane), etc. The peroxides can be employed from about 0.01 percent to about 5 percent by weight based on the total weight of the blend. In addition, the aliphatically unsaturated imide free polymer or blend thereof can be cured with heat or irradiation with high energy electrons, x-rays, ultraviolet light, etc., in addition to the aforementioned free radical initiators.

In addition to the aforementioned aliphatically unsaturated monomers, and organic polymers, the aliphatically unsaturated imide prepolymers of the present invention can be blended with from 0 to 200 parts of filler per 100 parts of the prepolymer. Included by the fillers which can be employed are, for example, clay, ground quartz, silica, sand, carbon black, glass fibers, glass beads, carbon fiber, asbestos, etc. In addition, other ingredients such as solvents are from 60 to 90 percent by weight of the resulting curable compositions also can be employed such as N-methylpyrrolidone, dimethylacetamide, toluene, ethylenechloride, as well as plasticizers such as dialkylphthalate, etc.

In order that those skilled in the art will be better able to practice the invention, the following examples are given by way of illustration and not by way of limitation.

EXAMPLE 1

A mixture of 98.06 parts of maleic anhydride, 99.13 parts of p,p'-methylenedianiline, 789.8 parts of distilled cresol and about 100 parts of xylene was stirred and heated to a temperature of 100° C. to produce a homogeneous solution. The mixture was then heated to a temperature of about 150° C. and a xylene-water azeotrope started to separate. Heating of the mixture was continued to a temperature of about 170° C. to effect the separation of about 93.3 percent of theoretical water of reaction of the maleic anhydride and the p,p'-methylenedianiline. The mixture was then allowed to cool to room temperature. It was poured slowly into excess methanol to affect the precipitation of product. The product was dried at 50° C. under reduced pressure for a period of about 5 hours. There was obtained a quantitative yield of a cream colored product. Based on method of preparation, the product was a low molecular weight polyimide having about three or four chemically combined imide units resulting from the reaction of maleic anhydride and p,p'-methylenedianiline.

The above prepolymer is molded at a temperature of 325° C. to produce a flexible film having a tensile strength of about 5,000 psi.

EXAMPLE 2

In accordance with the procedure of Example 1, a mixture of maleic anhydride, p,p'-methylenedianiline, cresol, and xylene was made utilizing an equal molar amount of maleic anhydride and p,p'-methylenedianiline. The mixture was stirred and heated until a clear solution was obtained at 135° C. At 192° C., a xylene-water a azeotrope began to distill over. After an hour of heating at a temperature to 213° C., 95.6 percent of the theoretical water was separated. The solution was then allowed to cool to room temperature. Based on method of preparation, there was obtained an olefinically unsaturated polyimide prepolymer. A film was cast from the solution on a glass substrate. The film was cured by heating it at 150° C. for 1 hour and 200° C. for 1 hour. The film was found to have valuable dielectric and insulating characteristics.

A portion of the above solution was slowly added to excess methanol resulting in the precipitation of a yellow-colored solid. The solid was dried at 100° C./8 mm for 5 hours. A portion of the yellow solid was molded at a temperature of 300° C. for 30 minutes at a pressure of 5,000 psi. There was obtained a test bar having superior shear modulus. The prepolymer is suitable for making bearings and automotive parts requiring high temperature stability.

The above procedure was repeated except that a solution was made utilizing 2 moles of p,p'-methylenedianiline, per mole of maleic anhydride. The mixture of maleic anhydride, p,p'-methylenedianiline, cresol and xylene was stirred and heated until a solution was formed at 140° C. Heating was continued until a xylene-water azeotrope began to distill from the solution at 170° C. The mixture was heated for an additional hour at a temperature to 210° C. resulting in the separation of 95.6 percent of the theoretical water of reaction. The mixture was poured into methanol to effect the precipitation of a quantitative yield of a cream colored solid. The solid began to soften at 132° C. and was sufficiently fluid at 166° C. to allow incorporation of a reinforcing filler. Based on method of preparation, the solid was an amine terminated polyimide prepolymer of about 3 or 4 chemically combined units of the reaction product of a p,p'-methylenedianiline and maleic anhyride.

A blend of 30 parts of the above prepolymer and 70 parts of glass fiber is made in a Waring blender. There is added 0.1 percent by weight of dicumyl peroxide. The resulting blend is molded at 165° C under a pressure of 5,000 psi to a test bar exhibiting superior shear modulus.

EXAMPLE 3

A mixture of 251.2 parts of distilled cresol, about 25 parts of xylene, 24.78 parts of p,p'-methylenedianiline and 29.02 parts of fumaric acid was heated and stirred until a solution was formed at 150° C. At 170° C., a xylene-water azeotrope began to distill over and the mixture was heated to 190° C. for an additional hour. This resulted in the separation of the theoretical amount of water of reaction between the dicarboxylic acid and the diamine. The mixture was then allowed to cool to room temperature and a cloudy heterogeneous mixture was obtained. A cream colored solid was obtained by pouring the mixture into methanol which was dried at 50°C under reduced pressure for about 5 hours. There was obtained about an 88 percent yield of product. The product softened at 205° C and flowed at 290° C.

A blend of 30 parts of the above product and 70 parts of glass fibers is milled. There is then added 0.1 part of benzoylperoxide to the resulting mixture. The mixture is then molded at 265° C. under a pressure of 5,000 psi for 15 minutes to produce a test bar. The product is found to be flexible and shows superior shear modulus indicating that it is useful as a laminating and molding compound.

EXAMPLE 4

A mixture of 229 parts of distilled cresol, 25 parts xylene, 24.78 parts of p,p'-methylenedianiline and 32.53 parts of itaconic acid was heated to a temperature of 120° C. resulting in the formation of a solution. A water-xylene azeotrope began to separate at 160° C. Upon continued heating to a temperature of 190° C. for a period of about an hour, there was effected about 100 percent separation of water of reaction of the itaconic acid and the p,p'-methylenedianiline. The solution was then allowed to cool to room temperature and added to an excess of methanol. A white solid precipitated. It was collected and dried at 50° C. under reduced pressure for 5 hours. Based on weight of starting reactants, there was obtained about an 85 percent yield of a polyimide prepolymer having a softening point of about 240°–250° C.

A test bar is made from the prepolymer in accordance with the method of Example 1. It is found to be flexible and suitable for making temperature resistant bearings.

EXAMPLE 5

A mixture of 9.8 parts of aniline, 34.7 parts of p,p'-methylenedianiline, 175 parts of cresol and 25 parts of xylene was added to 34.3 parts of maleic anhydride. The resulting mixture was slowly heated to a temperature of 180° C. and refluxed for 1 hour. During the course of heating, a solution of the various ingredients was obtained and water of reaction was separated. After a theoretical amount of water had been collected, the mixture was allowed to cool to room temperature. It was poured into excess methanol to produce a yellow precipitate. After the precipitate was dried under 14 mm/Hg pressure for 16 hours at about 25° C, there was obtained a substantial yield of product based on weight of starting material. The product softened at about 120° C. Based on method of preparation, the product was a polyimide prepolymer resulting from the reaction of p,p'-methylenedianiline, aniline, and maleic anhydride and averaging about three or four chemically combined reaction product units.

A blend is made of 30 parts of the above prepolymer and 70 parts of 3/16 inch glass fibers. There is added to the resulting blend, 0.3 parts of dicumyl peroxide. The mixture is milled and molded at 165° C. for 10 minutes at 5,000 psi. The resulting molded bar has a modulus of about $2 \times 10^6$ psi.

EXAMPLE 6

A mixture was made of 15.12 parts of m-phenylenediamine, 13.7 parts of maleic anhydride, 75 parts of distilled cresol and 75 parts of xylene. The mixture was heated with stirring to produce a solution at 60° C. At 140° C., a xylene-water azeotrope began to distill over. Heating of the mixture was continued to 160° C. resulting in the separation of 100 percent of the theoretical water of reaction of the maleic anhydride and the m-phenylenediamine. The mixture was then allowed to cool to room temperature. A prepolymer was precipitated from the mixture by slowly adding it to excess methanol. A 93 percent yield of a yellow solid was obtained by filtering the mixture. It was dried at 50° C. under reduced pressure for 5 hours. The product had a softening point of 350° C. Based on method of preparation, the product was a prepolymer having an average of about three or four chemically combined intercondensation units resulting from the reaction of maleic anhydride and m-phenylenediamine.

A film was cast from a 30 percent solids solution of the above prepolymer in N,N-dimethylformamide. The film was cured by heating it to a temperature of between 100°–250° C. over a period of about 1 hour. The cured product was flexible indicating that it would be suitable in a variety of coating applications such as a wire enamel.

EXAMPLE 7

A mixture was stirred and heated consisting of 46.5 parts of hexamethylenediamine, 27.4 parts of maleic anhydride, 150 parts of distilled cresol and 150 parts of xylene. A solution of the aforementioned ingredients was obtained with stirring at a temperature of about 70° C. A xylene-water azeotrope began to separate from the mixture at a temperature of 150° C. Heating was continued and at a temperature of 157° C. over 97 percent of the theoretical water was recovered. The mixture was then allowed to cool to room temperature. A film was cast from the resulting solution onto a glass substrate. It was cured at 100° C. for 1 hour and 200° C. for an additional hour. The film was found to be flexible and it had a cut-through temperature of 395° C. In measuring the cutthrough, the film was placed between 50 mil conducting wires under a 1,000 gram load in accordance with the method described in Precopio et al. U.S. Pat. No. 2,936,296 assigned to the same assignee as the present invention. The film was suitable as a wire enamel and other insulating applications requiring the services of a high temperature resistant material.

EXAMPLE 8

A mixture of 21.6 parts of m-phenylenediamine, 13.7 parts of maleic anhydride, 75 parts of distilled cresol and 75 parts of xylene was charged to a reaction vessel. The mixture was stirred and heated. At 60° C., a solution of the various ingredients was obtained. Heating of the mixture was continued to 140° C. resulting in the separation of a xylene-water azeotrope. The theoretical amount of water of reaction separated when the mixture was heated with stirring to 160° C. The mixture was then allowed to cool to room temperature. It was poured slowly into methanol to effect precipitation of reaction product. After it had been collected and dried for 5 hours at 50° C. under reduced pressure, there was recovered a 95.8 percent yield of a yellow solid. The product had a softening point of about 256°–259° C. Based on method of preparation and its infrared spectrum, the product was a polyimide prepolymer having an average of three or four chemically combined reaction product units of maleic anhydride and m-phenylenediamine.

EXAMPLE 9

The procedure of Example 9 was repeated, except that there was employed in the reaction mixture 39.2 parts of p,p'-methylenedianiline, 27.4 parts of maleic anhydride, 150 parts of distilled cresol and 150 parts of xylene. A solution of the ingredients was obtained at a temperature of about 60° C. A xylene-water azeotrope started to separate at a temperature of about 140° C. After heating the mixture to 175° C., 100 percent of the theoretical water of reaction of the p,p'-methylenedianiline and maleic anhydride separated. The solution was allowed to cool to room temperature and prepolymer was recovered following the same procedure as previously described. There was obtained a 94 percent yield of a cream colored product having a softening point of between 148°–150° C. Based on method of preparation and its infrared spec-

EXAMPLE 10

A mixture of 79.2 parts of p,p'-methylenedianiline, 20.6 parts of maleic anhydride, 11.4 parts of endomethylene tetrahydrophthalic anhydride, 250 parts of cresol and 50 parts of toluene is heated and stirred for 1 hour in accordance with the above-described procedure. A solution of the aforesaid mixture is formed at a temperature of about 60° C. A water-toluene azeotrope begins to separate from the mixture at a temperature of about 115° C. At a temperature of 155° C., the theoretical water of reaction of the organodiamine and unsaturated anhydride is collected. A prepolymer is precipitated by pouring the mixture into excess methanol after it is allowed to cool. There is obtained a quantitative yield of product.

A solution is made by mixing 10 parts of the prepolymer and 10 parts of dimethylformamide. The solution is employed to coat a 2×2 inch glass cloth by immersing the cloth into the solution. The cloth is dried at 120° C. for 8 minutes. After preparing 15 of such treated cloths, they are subjected to a pressure of 200 psi at room temperature and then slowly heated to 200° C. for 1 hour. There is obtained a void-free laminate which is useful as an electrical circuit board.

EXAMPLE 11

A mixture of 99.14 parts of methylenedianiline, 39.25 parts of maleic anhydride, 315.6 parts of cresol and 100 parts of toluene is heated at 100°–150° C. for 1 hour. During this period, the theoretical water of reaction is separated.

The mixture is cooled to 50° C. and 32.22 parts of benzophenonetetracarboxylic acid dianhydride is added. A clear viscous solution is obtained on cooling. A film is cast from the solution onto an aluminum substrate. The film is heated for 1 hour at a temperature between 100°-250° C. There is obtained a cured polyimide film which is found to be flexible and useful as an insulating material.

Although the above examples illustrate only a few of the very many variables which can be employed in the practice of the present invention, it should be understood that the present invention is directed to a method for making a much broader class of polyimide prepolymers and to the products produced thereby utilizing the organic diamines shown by formula (1) or mixtures of such materials with organic monoamines as previously defined, in combination with aliphatically unsaturated organic anhydrides, dicarboxylic acids, or mixtures thereof, employing the solvents and the conditions defined above.

We claim:

1. A method which comprises, (1) heating at a temperature in the range of from 80° to 200° C. a mixture comprising (A) from 0.5 to 2 moles of hydrocarbon diamine consisting essentially of arylene hydrocarbon diamine, per mole of (B) aliphatically unsaturated hydrocarbon dicarboxylic acid anhydride in the presence of (C) an inert hydrocarbon solvent, and (D) an inert phenolic solvent, (2) separating a hydrocarbon solvent-water azeotrope from the mixture of (1), and (3) recovering the curable condensation product of (A) and (B) from the resulting mixture of (1).

2. A method in accordance with claim 1, where the arylene hydrocarbon diamine is 4,4'-diaminodiphenylmethane.

3. A method in accordance with claim 1, where the aliphatically unsaturated organic anhydride is maleic anhydride.

4. A method in accordance with claim 1, where the aliphatically unsaturated hydrocarbon anhydride is a member selected from the group consisting of a mixture of maleic anhydride and endomethylene tetrahydrophthalic anhydride, a mixture of maleic anhydride and tetrahydrophthalic anhydride, and a mixture of maleic anhydride and up to 10 mole percent, based on the moles of hydrocarbon anhydride in said mixture of hydrocarbon dianhydride.

5. A method in accordance with claim 1, where the arylene hydrocarbon diamine is m-phenylenediamine.

6. A method in accordance with claim 1, where the arylene hydrocarbon diamine is a mixture of an arylene hydrocarbon diamine and an arylene hydrocarbon monoamine.

* * * * *